United States Patent [19]

Sakamoto et al.

[11] Patent Number: 4,873,677

[45] Date of Patent: Oct. 10, 1989

[54] CHARGING APPARATUS FOR AN ELECTRONIC DEVICE

[75] Inventors: Kenji Sakamoto; Nobuo Ishikawa; Motomu Hayakawa, all of Suwa, Japan

[73] Assignee: Seiko Epson Corporation, Tokyo, Japan

[21] Appl. No.: 216,914

[22] Filed: Jul. 7, 1988

[30] Foreign Application Priority Data

Jul. 10, 1987 [JP] Japan .......................... 62-106457[U]
Jul. 15, 1987 [JP] Japan ................................ 62-176399
Jul. 15, 1987 [JP] Japan ................................ 62-176400
Jul. 15, 1987 [JP] Japan ................................ 62-176401

[51] Int. Cl.$^4$ ...................... G04C 10/04; H01M 10/44
[52] U.S. Cl. ........................................ 368/204; 320/2; 320/61
[58] Field of Search ................... 368/64, 66, 203–205; 320/2, 21, 61

[56] References Cited

U.S. PATENT DOCUMENTS

| | | | |
|---|---|---|---|
| 4,371,269 | 2/1983 | Sutter | 368/205 |
| 4,644,246 | 2/1987 | Knaden | 320/21 |

FOREIGN PATENT DOCUMENTS

| | | | |
|---|---|---|---|
| 1027143 | 3/1958 | Fed. Rep. of Germany | 368/204 |
| 53-82473 | 7/1978 | Japan | 368/203 |
| 60-174976 | 9/1985 | Japan | 368/203 |
| 336027 | 3/1959 | Switzerland | 368/204 |

*Primary Examiner*—Vit W. Miska
*Attorney, Agent, or Firm*—Blum Kaplan

[57] ABSTRACT

An apparatus for charging a power storage device provided within an electronic device. A power source provides direct current which is alternated in direction through a pair of primary coils for inducing alternating current in a secondary coil of the electronic device. The pair of primary coils are fixed to a coil yoke all of which are supported within a casing of the apparatus. During charging of the power storage device, the electronic device is mounted to the outside surface of the casing whereby substantially all of the magnetic flux of the magnetic field produced by the pair of primary coils flows through the secondary coil and coil yoke. The frequency of the oscillating signal is preset to provide the maximum induced current which will not adversely affect the movement of the analog mechanisms within the electronic device.

36 Claims, 6 Drawing Sheets

CHARGING APPARATUS FOR AN ELECTRONIC DEVICE

BACKGROUND OF THE INVENTION

This invention relates to a charging apparatus, and more particularly to a charging apparatus for use with an electronic device.

Different charging apparatuses for charging an electronic device such as, but not limited to, an analog electronic timepiece, are presently available. Generally, light or electromanetic energy from or a direct connection to an external power source is used to recharge a battery within the timepiece.

A typical charging apparatus employing light energy includes a solar battery as part of a dial plate of the timepiece. The solar battery generates electric power for charging a secondary battery located within the timepiece.

A charging apparatus employing a direct connection to an external power source is disclosed within Japanese Patent Laid-Open Application Nos. 154665/77 and 11846/74 and Japanese Utility Model Publication No. 4240/81. The battery located within the timepiece is charged by connecting a lead between the external power source and a terminal located on the external surface of the timepiece.

A charging apparatus for transferring electromagnetic energy from an external source to the timepiece is disclosed in Japanese Patent Laid-Open Application No. 29783/86. The source of electromagnetic energy is coupled to a charging coil disposed within the timepiece which induces a current for charging a battery also disposed within the timepiece. A counting coincidence circuit of the timepiece counts and thereby controls the length of time during which the battery is charged. The timepiece also includes a motor and a motor driving circuit for regulating the motor. The motor driving circuit maintains the motor in a deenergized (i.e. OFF) state during the charging period. The timepiece also includes compensating circuitry for correcting the time displayed by the timepiece for the charging period when the motor is deenergized. Each of these conventional charging apparatuses has one or more drawbacks. These drawbacks are particularly undesirable when the timepiece is an analog electronic wristwatch.

Charging apparatuses employing a solar battery or a direct connection from an external power source limit the variety of ornamental wristwatch designs which can be used. The limitation is due to the physically small size of the wristwatch. The difficulty in providing a variety of ornamental wristwatch designs is particularly troublesome when the ornamental appearance is commercially significant.

Charging apparatuses which transfer electromagnetic energy to a wristwatch as disclosed in Japanese Patent Laid-Open Application No. 29783/86 adversely affect the movement of a step motor of the wristwatch resulting in improper hand movement of the watch. Motor control circuitry, counting circuitry and circuitry (i.e. consistent means) are required in the timepiece in order to provide continuous and accurate hand movement during the charging period. Such circuitry limits the variety of different ornamental wristwatch designs available and increases the cost of manufacturing an analog electronic wristwatch. This type of charging device also can be used as a window display during charging of the wristwatch. Unfortunately, an undesirable image of the watch is created due to hand movement being halted during the charging period. The magnetic field also adversely affects any other analog timepiece positioned near the window display of the charging device.

It is therefore desirable to provide a charging device for an electronic timepiece such as a wristwatch which is relatively small in size, inexpensive to manufacture and which charges the battery of the wristwatch in a relatively short period of time. The charging device should also consume relatively little energy and increase the efficiency in transferring energy to the battery of the wristwatch compared to charging devices presently commercially available.

SUMMARY OF THE INVENTION

Generally speaking, in accordance with the invention, a charging apparatus for charging a power storage device in an electronic device includes a power source for producing direct current and a pair of primary coils. The primary coils are connected electrically in series and generate an alternating magnetic field which passes through a secondary coil located within the electronic device. The alternating magnetic field induces alternating current in the secondary coil which is rectified to charge the power storage device.

The charging apparatus also includes a coil yoke for positioning the primary coils relative to each other and an oscillating circuit for generating an oscillating signal. Switching circuitry within the charging apparatus alternates the direction of the direct current flowing through the primary coils in response to the oscillating signal.

A case member of the charging apparatus includes a pair of fingers for receiving and holding the electronic device. The pair of primary coils and coil yoke are supported within the case member at a predetermined distance relative to the fingers so that substantially all of the magnetic flux of the magnetic field flows through the secondary coil and the coil yoke resulting in the efficient coupling of energy to the electronic device.

In another embodiment, the oscillating circuit includes a variable resistor operable for changing the constant of the oscillating circuit and thereby adjusting the frequency of the oscillating signal to a predetermined level. The predetemined frequency level is set to avoid adversely affecting operation of a permanent magnet rotor which is part of a motor located within the electronic device. The motor is used to provide power for moving the hands of the watch.

The switching circuitry includes four pairs of transistors connected electrically together to form a parallel circuit. Two of the four pairs of transistors form a first branch of the parallel circuit. The second two pairs form a second branch of the parallel circuit. Each pair of transistors serves as a transistor switch, that is, each branch of the parallel circuit has two transistor switches connected electrically in series. The pair of primary coils are connected between the two transistor switches of the first parallel branch and the two transistor switches of the second parallel branch. By electrically opening one transistor switch and closing the other transistor switch in each branch of the parallel circuit, current flows through the pair of primary coils in a first direction. By opening the transistor switches which were previously closed and closing the transistor switches which were previously opened, current flows through the pair of primary coils in a direction opposite to the first direction. This generates an alternating magnetic field in the primary coils.

Accordingly, it is an object of the invention to provide an improved charging apparatus which is relatively small in size and inexpensive to manufacture.

It is another object of the invention to provide an improved charging apparatus which charges the battery of the electronic apparatus in a relatively short period of time while consuming relatively little energy.

It is a further object of the invention to provie an improved charging apparatus which efficiently transfers energy from the charging apparatus to the electronic device.

It is still another object of the invention to provide an improved charging apparatus which transfers electromagnetic energy from a charging apparatus to an electronic device without adversely affecting the operation of the electronic device during charging.

Still other objects and advantages of the invention will in part be obvious and will in part be apparent from the specification.

The invention accordingly comprises several steps in a relation of one or more of such steps with respect to each of the others, and the apparatus embodying features of construction, a combination of elements, and arrangements of parts which are adapted to effect such steps, all is exemplified in the following detailed disclosure and the scope of the invention will be indicated in the claims.

BRIEF DESCRIPTION OF THE DRAWINGS

For a fuller understanding of the invention, reference is had to the following description taken in connection with the accompanying drawings, in which.

DESCRIPTION OF THE PREFERRED EMBODIMENTS

Figure 1:
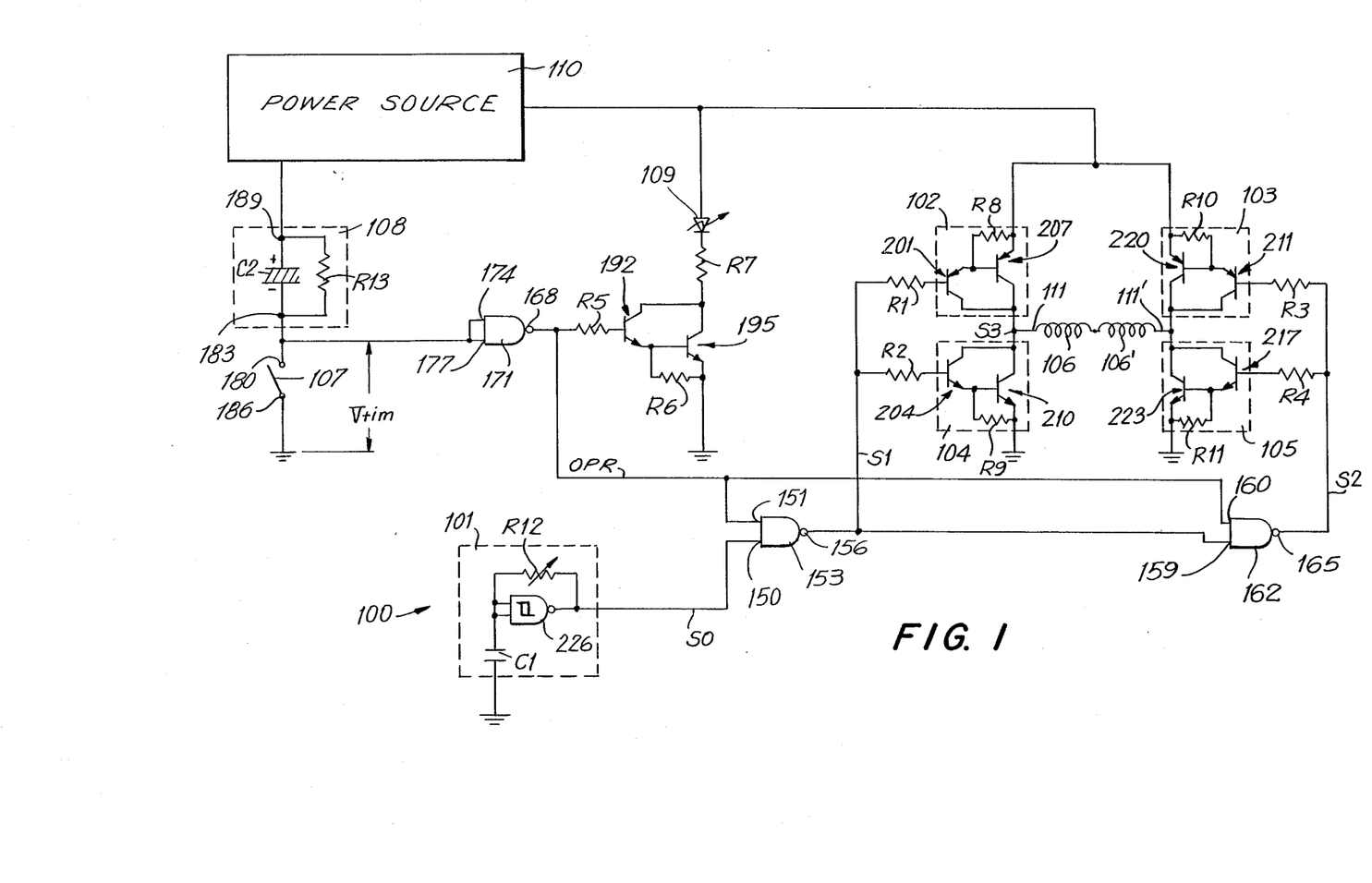
FIG. 1 is a circuit schematic of a charging device in accordance with the invention.

FIG. 1 illustrates a charging device 100 which includes an oscillator 101 for producing an output signal S0. Oscillator 101 includes a Schmidtt trigger NADD gate 226, a variable resistor R12 connected between the inputs and output of Schmidtt trigger NAND gate 226 and a capacitor C1 connected between the inputs of Schmidtt trigger NAND gate 226 and a common reference voltage level such as ground. Oscillator 101 is a well known oscillator using input hysterises of NAND gate 226 to produce oscillating signal S0. Signal SO is provided to an input 150 of a NAND gate 153. An output 156 of NAND gate 153 provides a signal S1 to the base of a transistor 201 through a resistor R1, to the base of transistor 204 through a resistor R2 and to an input 159 of a NAND gate 162. An output 165 of NAND gate 162 provides a signal S2 to the base of a transistor 214 through a resistor R3 and to the base of a transistor 217 through a resistor R4. An input 151 of NAND gate 153 and an input 160 of NAND gate 162 are connected together to an output 168 of a NAND gate 171. Output 168 of NAND gate 171 produces a signal OPR which is supplied to input 151 of NAND gate 153 and to input 160 of NAND gate 162. A first input 174 and a second input 177 of NAND gate 171 are connected together, to a terminal 180 of a switch 107 and to an output 183 of a timer 108. A second terminal 186 of switch 107 is connected to the common reference voltage level such as ground. The voltage potential across switch 107 is denoted by voltage Vtim. An input 189 of timer 108 is connected to a d.c. power source 110. Timer 108 also includes a resistor R13 and a capacitor C2. With switch 107 closed, capacitor C2 of timer 108 charges to the voltage level of d.c. power source 110 and voltage Vtim is at a logic level of 0.

Output 168 of NAND gate 171 is also connected to the base of a transistor 192 through a resistor R5. The emitter of transistor 192 is connected to the base of a transistor 195 and to the emitter of transistor 195 through a resistor R6. The collectors of transistors 192 and 195 are connected together to one end of a resistor R7. Transistors 192 and 195 and resistor R6 are commonly referred to as a Darlington amplifier and provide a high current gain. The other end of resistor R7 is connected to one end of a LED 109. The other end of LED 109 is connected to d.c. power source 110 through a node 198. The emitter of transistor 195 is connected to the common reference voltage level such as ground.

The collector of a transistor 207 is connected to the collector of transistor 201. The emitter of transistor 201 is connected to the base of transistor 207 and to the emitter of transistor 207 through a resistor R8. Transistors 201 and 207 and resistor R8 form a Darlington amplifier which serves as a transistor switch 102.

The collector of a transistor 210 is connected to the collector of transistor 204. The emitter of transistor 204 is connected to the base of transistor 210 and to the emitter of transistor 210 through a resistor R9. The emitter of transistor 210 is connected to the common reference voltage such as ground. Transistors 204 and 210 and resistor R9 form a Darlington amplifier which serves as a transistor switch 104.

The collector of transistor 214 is connected to the collector of a transistor 220. The base of transistor 220 is connected to the emitter of transistor 214. The emitter of transistor 220 is connected to the emitter of transistor 214 through a resistor R10. Emitters of transistors 220 and 207 are also connected to d.c. power source 110 through node 198. Transistors 214 and 220 and resistor R10 form a Darlington amplifier and act together as a transistor switch 103.

The collector of transistor 217 is connected to the collector of a transistor 223. The base of transistor 223 is connected to the emitter of transistor 217. The emitter of transistor 223 is also connected to the emitter of transistor 217 through a resistor R11. The emitter of transistor 223 is connected to the common reference voltage such as ground. Transistors 217 and 223 and resistor R11 form a Darlington amplifier and act together as a transistor switch 105.

A pair of charging coils 106 and 106' are connected electrically in series. An end 111 of charging coil 106 is connected to the collectors of transistors 201, 204, 207 and 210 (i.e. between transistor switches 102 and 104). An end 111' of charging coil 106' is connected to the collectors of transistors 214, 217, 220 and 223 (i.e. between transistor switches 103 and 105).

Figure 4:
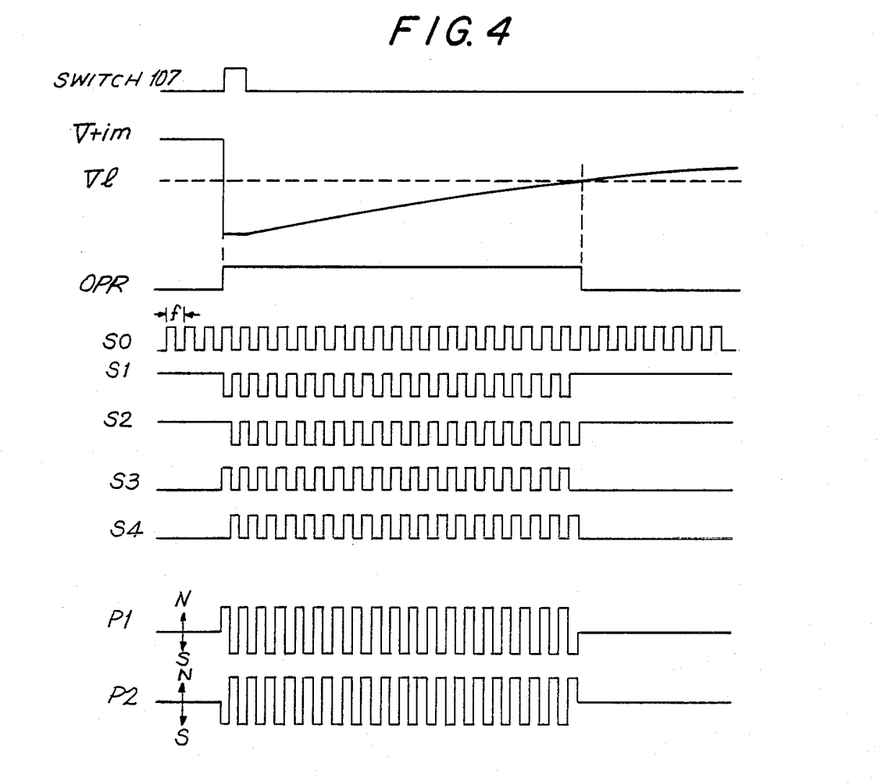
FIG. 4 is a timing chart illustrating the signals produced within the circuit schematic of FIG. 1.

Referring now to FIGS. 1 and 4, the charging operation of an analog electronic watch 117 (shown in FIG. 5) is begun by opening switch 107 once capacitor C2 has been fully charged to the level of d.c. power source 110. Capacitor C2 begins to charge through resistor R13. Voltage $\overline{V}tim$ gradually rises from a logic level of 0 to above a level of voltage $\overline{V}_l$ which represents the minimum value of a logic level equal to 1. The rise in voltage $\overline{V}tim$ is based on the RC time constant of timer 108 (i.e. the product of the resistance of resistor R13 and capacitance of capacitor C2). Prior to voltage $\overline{V}tim$ reaching level $\overline{V}_l$, signal OPR is at a high logic level of 1. While signal OPR is at a high logic level of 1 alternating current flows through charging coils 106 and 106' as described below. Simultaneously, transistor 192 is turned on so that current flows through LED 109 to indicate that the charging operation is underway. Once voltage $\overline{V}tim$ reaches the level of voltage $\overline{V}_l$ the charging operation ends. More particularly, with voltage $\overline{V}tim$ at a logic level of 1, signal OPR is at a low logic level of 0. Signals S1 and S2 are at a high logic level of 1 which results in transistor switches 104 and 105 being turned on. A pair of signals S3 and S4, which represent the voltages at ends 111 and 111' of charging coils 106 and 106', respectively, are now at approximately ground potential. Since signals S3 and S4 are at the same voltage potential, no current flows through coils 106 and 106' (i.e. charging operation ends).

During charging of wristwatch 117, the flow of current through charging coils 106 and 106' alternate in opposite directions depending upon which of the four transistor switches 102, 103, 104 and 105 are closed. More particularly, when transistor switches 102 and 105 are closed (i.e. transistors 201, 207, 217 and 223 are turned on) and transistor switches 103 and 104 are opened (i.e. transistors 204, 210, 214 and 220 are turned off) current provided by d.c. power source 110 flows from end 111 of charging coil 106 to end 111' of charging coil 106'. When switches 103 and 104 are closed (i.e. transistors 204, 210, 214 and 220 are turned on) and switches 102 and 105 are opened (i.e. transistors 201, 207, 217 and 223 are turned off) current flows from end 111' of charging coil 106' to end 111 of charging coil 106.

Figure 2:
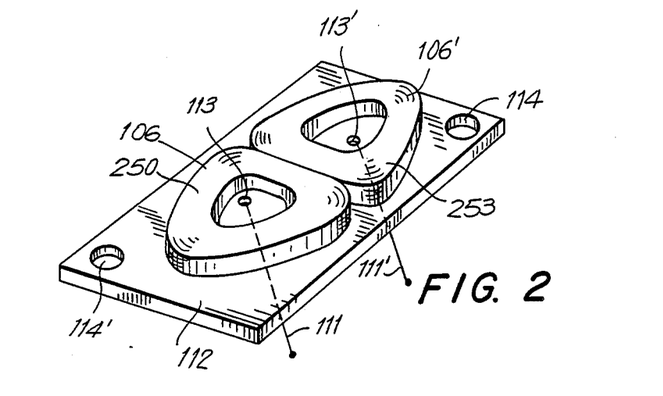
FIG. 2 is a perspective view of a pair of charging coils of a charging device of the type shown in FIG. 1.

As shown in FIG. 2 charging coils 106 and 106' are coupled to a coil yoke 112. Coil yoke 112 is a substantially rectangular plate made from iron, permeable steel or a like material. Charging coils 106 and 106' each have a substantially triangular ring-like contour. Charging coils 106 and 106' are not limited to substantially triangular ring-like contours and may have other different configurations such as, but not limited to, cylindrical contours. Charging coils 106 and 106' are shown in FIG. 1 connected electrically in series but also can be connected electrically in parallel.

Upon applying an alternating voltage across charging coils 106 and 106', that is, across ends 111 and 111' of charging coils 106 and 106', respectively, an alternating magnetic field is generated by charging coils 106 and 106'. Charging coils 106 and 106' are operated so that opposite polarities exist on an upper end 250 and an upper end 253 of charging coils 106 and 106', respectively. In other words, when current flows through serially connected charging coils 106 and 106' in a first direction, upper surface 250 of charging coil 106 has a N (i.e. north) polarity and upper surface 253 of charging coil 106' has a S (i.e. south) polarity. When the current flowing through charging coils 106 and 106' reverses direction, upper surface 250 of charging coil 106 has a S polarity and upper surface 253 of charging coil 106' has a N polarity. The opposite polarities of upper surfaces 250 and 253 of charging coils 106 and 106', respectively, are obtained by winding charging coils 106 and 106' in opposite directions and connecting the charging coils together electrically in series or otherwise connecting coils 106 and 106' together so that the front or rear sides of the respective coils lie in opposing adhering directions (i.e. in directions which attract each other).

The end opposite to end 111 of charging coil 106 and the end opposite to end 111' of charging coil 106' are electrically connected to each other. Ends 111 and 111' are drawn through openings 113 and 113' of coil yoke 112, respectively. A pair of openings 114 and 114' of coil yoke 112 allow passage therethrough of a pair of fixing screws 125 and 125' (shown in FIG. 9) to secure coil yoke 112 to a casing 123 (shown in FIG. 9) of charging device 100.

Figure 3:
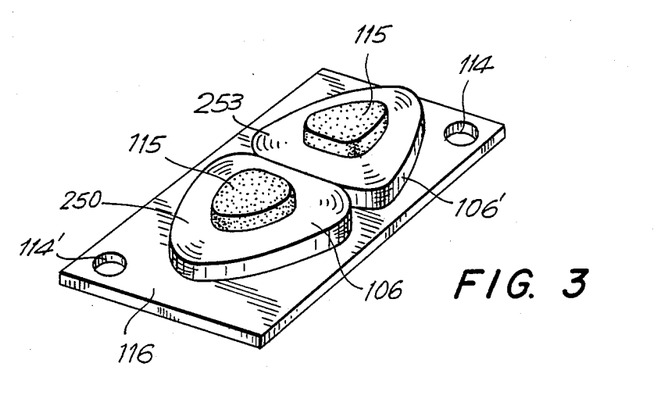
FIG. 3 is a perspective view of a pair of charging coils in accordance with an alternative embodiment of the invention.

As shown in FIG. 3, charging coils 106 and 106' can be wound around a pair of magnetic cores 115 and 115', respectively. Each of the magnetic cores 115 and 115' are made from a malleable iron or other suitable material. Charging coils 106 and 106' are secured to a substrate 116 of coil yoke 112. Substrate 116 is made from plastic, glass epoxy or the like.

Referring once again to FIG. 4, the signals at various points within the circuit of FIG. 1 and polarities of coils 106 and 106' are illustrated relative to each other. Signal SO produced by oscillator 101 is a substantially square wave having a frequency f. By adjusting resistor R12 which varies the constant of oscillator 101, frequency f of signal SO can be set to a predetermined value for charging wristwatch 117. The range of acceptable frequencies is discussed in greater detail below. Signals S1 and S2 produced by NAND gates 153 and 162, respectively, are 180 degrees out of phase with each other when signal OPR is at a high logic level of 1. Signal S2 is in phase with output signal SO of oscillator 101 when signal OPR at a high logic level of 1 (i.e. signals SO and S1 are 180 degrees out of phase with each other). Signals S3 and S4 are 180 degrees out of phase with each other, signals S2 and S3 are in phase with each other and signals S1 and S4 are in phase with each other when signal OPR at a high logic level of 1. The flow of current through charging coils 111 and 111' alternate in direction based on frequency f, that is, the frequencies of S3 and S4 are determined by frequency f of signal SO when signal OPR is at a high logic level of 1. A pair of polarities P1 and P2 represent the directions of the magnetic polarities formed on upper ends 250 and 253 of coils 106 and 106', respectively. Polarities P1 and P2 are 180 degrees out of phase with each other.

The construction of charging device 100 has been described based on the circuitry shown in FIG. 1. It is to be understood, however, that charging device 100 can be constructed using other circuitry which provides alternating current flow through coils 106 and 106'. For example, an oscillating circuit using quartz oscillators and ceramic oscillating circuits can be employed in lieu of oscillator 101. Charging device 100 also has been disclosed heretofore with oscillator 101 operating during charging and noncharging periods of operation. If desired, timer 108 can be coupled to oscillator 101 so that signal S0 is generated only during charging periods.

Figure 5:
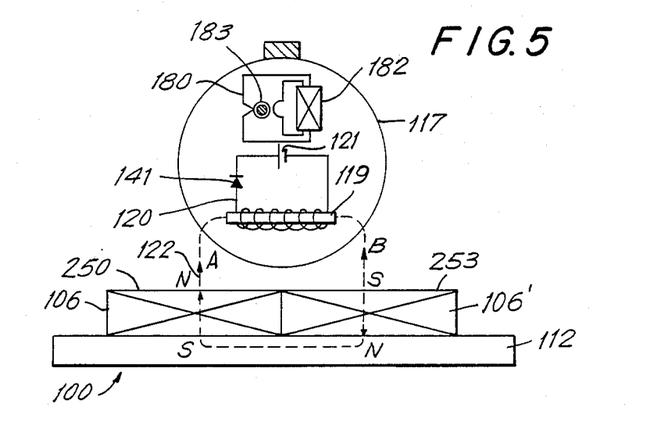
FIG. 5 is a diagrammatic view of the charging device and an analog electronic wristwatch.

As shown in FIG. 5, analog electronic wristwatch 117 includes a coil 118 having a core 119 and connected to a rectifying circuit 120 which includes a diode 141. A battery 121, which serves as the power source for wristwatch 117, is connected in series with coil 118 of rectifying circuit 120. During charging, wristwatch 117 is disposed near charging device 100 so that the magnetic flux from the magnetic field created by charging coils 106 and 106' passes through coil 118 of wristwatch 117. The magnetic circuit formed includes charging coils 106 and 106', coil 118, core 119 and coil yoke 112 with charging coil 106 and 106' acting as a pair of primary coils and coil 118 acting as a secondary coil. The magnetic flux alternates in directions denoted by arrows A and B. Consequently, magnetic flux 122 induces a voltage across coil 118 resulting in an induced current flowing through rectifying circuit 120 to charge battery 121. Wristwatch 117 also includes a step motor 180 having a stator 182 and a permanent magnet 183. Motor 180 is powered by battery 121 through coupling of stator 182 to charging battery 121.

Substantially all of magnetic flux 122 passes through coil yoke 112 due to charging coils 106 and 106' being fixed to coil yoke 112. Coil yoke 112 aids in the concentration and direction of alternating magnetic flux 122 to provide an effective coupling of magnetic flux 122 to coil 118. Without coil yoke 112, the path of magnetic flux 122 would travel through air resulting in far less magnetic flux 122 passing through coil 118. A far less efficient coupling of magnetic flux between charging coils 106 and 106' and coil 118 would result.

Since charging coils 106 and 106' have opposite polarities relative to each other, the path of magnetic flux 122 passes from surface 250 to coil 118 to surface 253 when magnetic flux 122 flows in the direction of arrow A and from surface 253 to coil 118 to surface 250 when magnetic flux 122 flows in the direction of arrow B. In contrast thereto, if the polarities of charging coils 106 and 106' were the same, that is, the polarities of surfaces 250 and 253 were the same, repulsion of a portion of magnetic flux 122 near coil 118 would occur. Less magnetic flux would be coupled to coil 118 resulting in far less induced current charging battery 121 at any instance in time. In other words, a far less efficient coupling of magnetic flux and charging of battery 121 would result.

Figure 6:
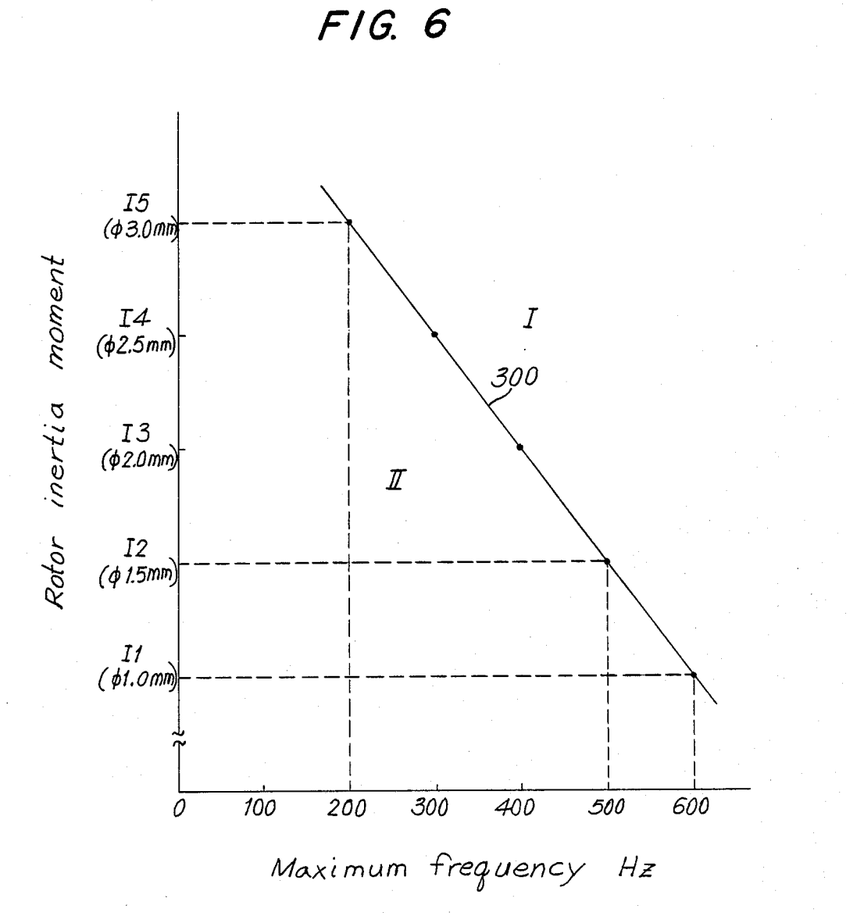
FIG. 6 is a plot of rotor inertia moment of the wristwatch vs. frequency of the alternating magnetic field produced by a pair of charging coils.

FIG. 6 illustrates the inertia moment of rotor 183 vs. the maximum frequency of the magnetic field created by charging coils 106 and 106'. Rotor 183 does not operate at frequencies to the left of a line 300 (i.e. region I). Consequently, frequencies within region I will not adversely affect the movement of the hands of wristwatch 117 or otherwise cause misoperation or undesirable vibration or the like of wristwatch 117. Frequencies to the right of line 300 (i.e. region II) adversely affect rotor movement and should be avoided. The rotor inertia moments I1, I2, I3, I4 and I5 are based on the diameter of rotor 183 being 1.0 mm., 1.5 mm., 2.0 mm., 2.5 mm. and 3.0 mm., respectively. When the diameter of rotor 183 is 3 mm. (i.e. rotor inertia moment I5), the maximum frequency of the a.c. magnetic field created by charging coils 106 and 106' is 200 hertz. Therefore, at rotor inertia moment I5 the frequency of the a.c. magnetic field must be greater than 200 hertz to avoid adversely affecting hand movement of wristwatch 117. Similarly, for inertia moments I2 and I1 the a.c. magnetic field frequency must be greater than 500 hertz and 600 hertz, respectively, to prevent the hand movement of wristwatch 117 from being adversely affected. Generally, wristwatch 117 will have a rotor diameter of no greater than 3.0 mm. and no less than 1.0 mm. The maximum rotor diameter of approximately 3.0 mm. is based on the limitation of the measure. The minimum rotor diameter is based on the manufacturing limitations (i.e. processing capacity) in producing rotor 183. Most small sized thin type analog electronic wristwatches have rotor diameters of 1.5 mm. or less. Consequently, an a.c. magnetic field frequency of greater than 500 hertz can be used without creating any adverse effect on the hand movement of wristwatch 117.

Figure 7:
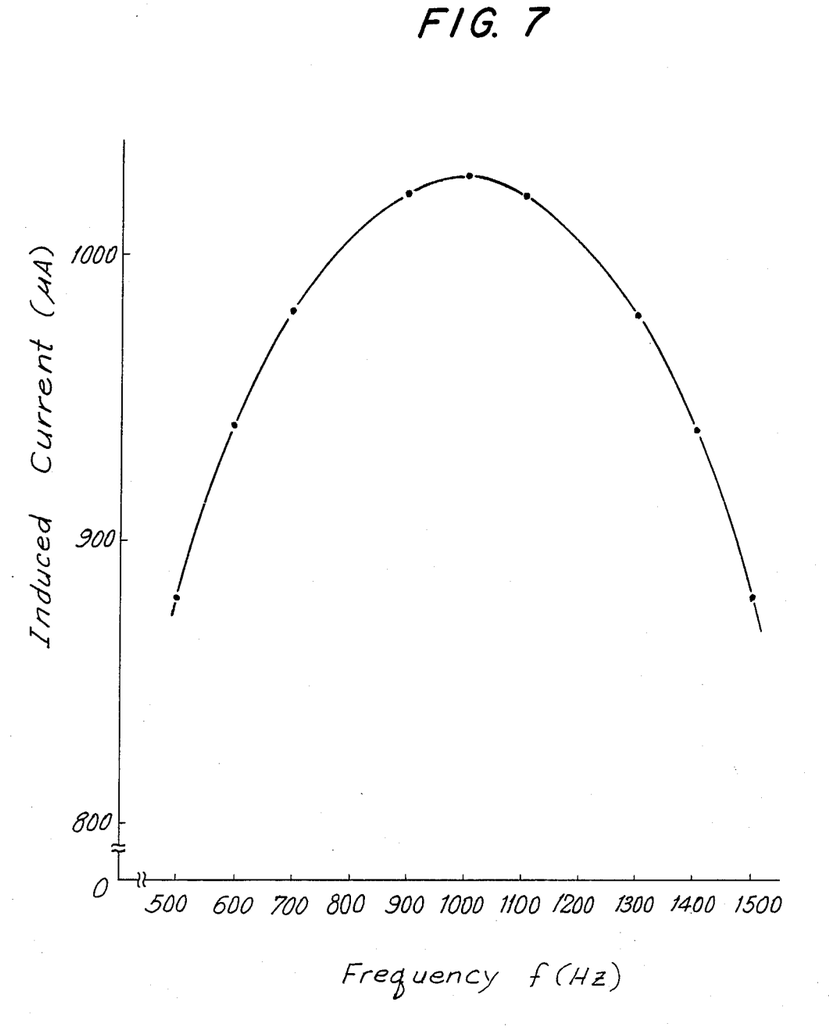
FIG. 7 is a plot of induced current flowing through a secondary coil of the watch vs. frequency of the alternating magnetic field produced by the charging coils.

FIG. 7 illustrates the induced current measured in microamperes produced by coil 118 for charging battery 121 plotted against the a.c. magnetic field frequency. Charging coils 106 and 106' each have a wire diameter of approximately 0.3 mm., a winding number of 170 turns and inductance of 0.64 millihenries. Coil 118 has a wire diameter of approximately 0.035 mm., a winding number of approximately 3830 turns and an inductance of approximately 0.5 henries. With charging coils 106 and 106' and coil 118 having the aforementioned values, the induced current peaks at a frequency of about 1,000 hertz. Since a frequency of 1,000 hertz is within region I of FIG. 6, by adjusting oscillator 101 so that output signal S0 has a frequency of approximately 1,000 hertz a maximum induced current in coil 118 is provided without adversely affecting the movement of rotor 183.

Figure 8:
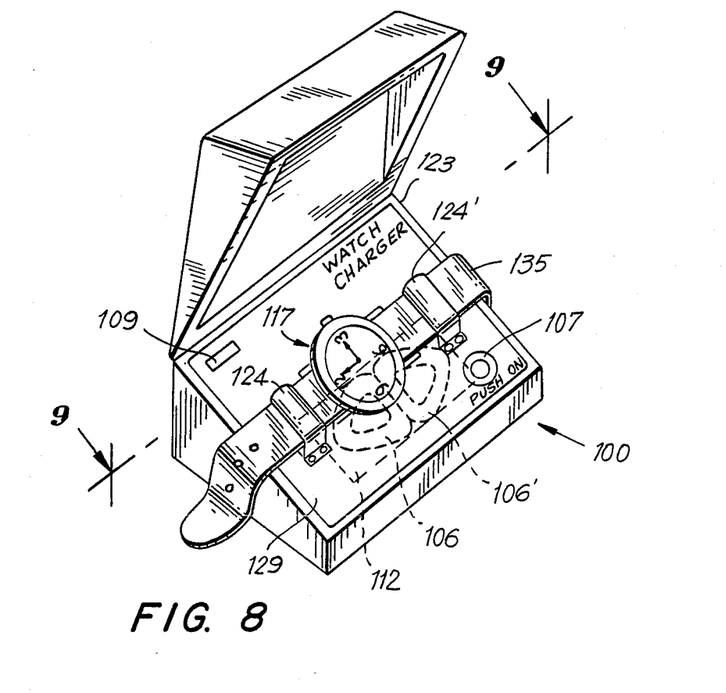
FIG. 8 is a perspective view of a wristwatch mounted on a charging device in accordance with the invention.

FIG. 8 illustrates wrist-watch 117 mounted to charging device 100. A pair of fixing members such as fingers 124 and 124' are positioned on a top surface 129 of casing 123. During charging of watch 117, a wristband 135 of watch 117 is slid into and received by fingers 124 and 124' so as to properly position coil 118 of watch 117 relative to charging coils 106 and 106' of charging device 100. LED 109 is positioned within casing 123 so as to be seen when viewed from top surface 129. Switch 107, which is pressed for starting timer 108, is also accessible from top surface 129.

Figure 9:
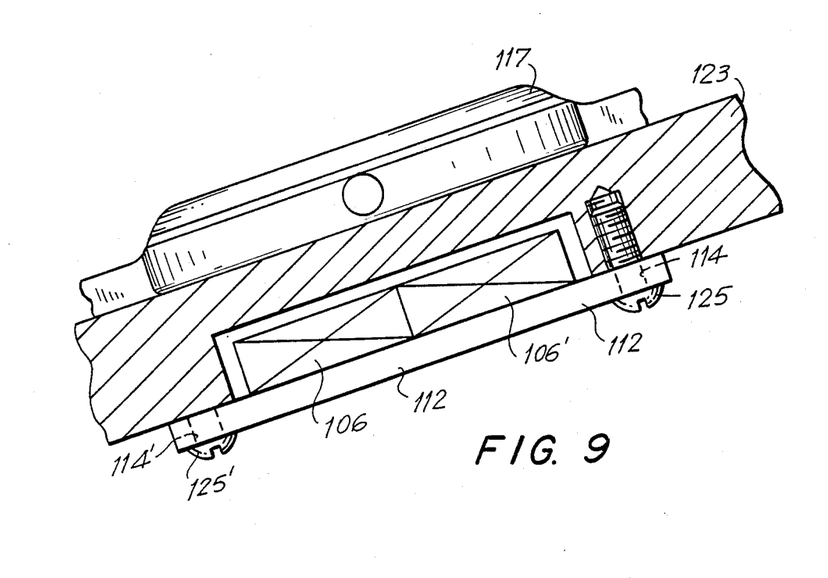
FIG. 9 is a sectional view taken along lines 9—9 of FIG. 8.

As shown in FIG. 9, screws 125 and 125' extend through openings 114 and 114' of coil yoke 112 and are screwed into a pair of openings 139 of casing 123 for securely disposing coil yoke 112 and charging coils 106 and 106' at a predetermined location within casing 123. Consequently, charging coils 106 and 106', coil yoke 112 and coil 118 are positioned relative to each other as shown in FIG. 5 to efficiently couple magnetic flux 122 from coils 106 and 106' to coil 118. Other suitable fixing members or materials such as adhesive can be used in lieu of screws 125 and 125' for securing the assembly of coil yoke 112 and charging coils 106 and 106' to casing 123.

As now can be readily appreciated, charging apparatus 100 is far more efficient than conventional charging apparatuses for transferring energy from an external source to an electronic device. Charging apparatus 100 does not adversely affect the operation of a watch's hand movement or adversely affect any other analog movements of watch 117. Since electromagnetic induction is employed for charging, no mechanical connector is required to transfer energy to battery 121 for charging the latter. Charging apparatus 100 does not limit as severely the shape of watch 117 and, in particular, the external ornamental appearance of watch 117 as compared to watches employing conventional charging apparatus. Furthermore, charging coils 106 and 106' and coil yoke 112 are positioned to provide an efficient coupling of magnetic flux 122 to coil 118. Charging device 100 is also applicable for charging other types of electronic devices in addition to analog electronic wristwatch 117 such as card-type pocket radios, liquid crystal pocket televisions or the like.

It will thus be seen that the objects set forth above, and those made apparent from the preceding description are efficiently attained and, since certain changes may be made in the above method and construction set forth without departing from the spirit and scope of the invention, it is intended that all matter contained in the above description and shown in the accompanying drawings shall be interpreted as illustrative and not in a limiting sense.

It is also to be understood that the following claims are intended to cover all the generic and specific features of the invention herein described and all statements of the scope of the invention, which as a matter of language, might be said to fall therebetween.

What is claimed is:

1. An apparatus for charging a power storage device provided within an electronic device which also includes at least one secondary coil, said apparatus comprising:
    a power source for producing direct current;
    a pair of primary coils for generating a magnetic field which passes through the at least one secondary coil and for inducing alternating current in the at least one secondary coil of the electronic apparatus;
    a coil yoke for positioning the primary coils relative to each other;
    oscillating means for generating an oscillating signal;
    switching means for alternating the direction of the direct current flowing through the primary coils in response to the oscillating signal; and
    a case member including mounting means for receiving and holding the electronic device, said case member supportng the pair of primary coils and the coil yoke at a predetermined distance relative to the mounting means whereby during charging of the power storage device substantially all of the magnetic flux of the magnetic field generated by primary coils flows through the coil yoke and at least one secondary coil in the electronic device.

2. The apparatus of claim 1, wherein the pair of primary coils resemble a pair of substantially triangular shaped rings.

3. The apparatus of claim 2, wherein the pair of primary coils include metallic cores.

4. The apparatus of claim 3, wherein the metallic cores are made of malleable iron.

5. The apparatus of claim 4, wherein the coil yoke has a substrate selected from the group of materials consisting of glass epoxy and plastic.

6. The apparatus of claim 5, wherein the coil yoke is made of a magnetic permeable material.

7. The apparatus of claim 1, wherein the coil yoke is a substantially rectangular plate on which the pair of primary coils are fixed.

8. The apparatus of claim 7, wherein the coil yoke is made of a magnetic permeable material.

9. The apparatus of claim 1, wherein the pair of primary coils are connected electrically in series.

10. The apparatus of claim 1, wherein the pair of primary coils have substantially triangular contours and are disposed adjacent to each other along a planar surface of the coil yoke.

11. The apparatus of claim 10, wherein the pair of primary coils are connected electrically in series.

12. The apparatus of claim 1, wherein the pair of primary coils, when energized, have opposite polarities.

13. The apparatus of claim 1, wherein the power storage device is a battery.

14. The apparatus of claim 1, wherein the electronic device is a timepiece.

15. The apparatus of claim 14, wherein the timepiece is a wristwatch.

16. The apparatus of claim 1, wherein the switching means includes four pairs of transistors connected electrically together to form a parallel circuit, two pair of said four pairs of transistors forming a first branch and the other two pairs of transistors forming a second branch of the electrically parallel circuit.

17. The apparatus of claim 16, wherein the pair of primary coils are connected electrically in series wih one end of the pair of primary coils electrically connected between said two pair of said four pairs of transistors and with the other end of the pair of primary coils electrically connected between the other two pairs of transistors.

18. The apparatus of claim 1, wherein the oscillating circuit includes a Schmidtt trigger.

19. The apparatus of claim 1, further including timing means for controlling the length of time during which the oscillating signal is provided to the switching means.

20. The apparatus of claim 19, wherein the timing means includes at least one resistor and at least one capacitor forming a predetermined RC time constant.

21. The apparatus of claim 1, wherein the electronic device further includes a motor having a rotor and wherein oscillating means includes adjusting means for presetting the frequency of the oscillating signal to avoid adversely affecting operation of the rotor.

22. The apparatus of claim 21, wherein the rotor is a permanent magent.

23. The apparatus of claim 21, wherein the adjusting means is operable for presetting the frequency of the oscillating signal above 200 hertz.

24. The apparatus of claim 23, wherein the adjusting means is operable for presetting the frequency of the oscillating signal to approximately 1,000 hertz.

25. The apparatus of claim 21, wherein the pair of primary coils resemble a pair of substantially triangular shaped rings.

26. The apparatus of claim 25, wherein the pair of primary coils include metallic cores.

27. The apparatus of claim 26, wherein the metallic cores are made of malleable iron.

28. The apparatus of claim 27, wherein the coil yoke has a substrate selected from the group of materials consisting of glass epoxy and plastic.

29. The apparatus of claim 28, wherein the coil yoke is made of a magnetic permeable material.

30. The apparatus of claim 21, wherein the coil yoke is a substantially rectangular plate on which the pair of primary coils are fixed.

31. The apparatus of claim 21, wherein the coil yoke is made of a magnetic permeable material.

32. The apparatus of claim 21, wherein the pair of primary coils are connected electrically in series.

33. The apparatus of claim 32, wherein the pair of primary coils have substantially triangular contours and disposed adjacent to each other along a planar surface of the coil yoke.

34. The apparatus of claim 21, wherein the pair of primary coils, when energized, have opposite polarities.

35. An apparatus for charging a power storage device provided within an electronic device which also includes at least one secondary coil and a motor having a rotor, said apparatus comprising:
 a power source for producing direct current;
 a pair of primary coils electrically connected in series resembling a pair of substantially triangular shaped rings for generating a magnetic field which passes through the at least one secondary coil and for inducing alternating current in the at least one secondary coil of the electronic apparatus;
 a coil yoke made of a magnetic permeable material and having a substantially rectangular shape for positioning the primary coils relative to each other;
 oscillating means for generating an oscillating signal and including adjusting means for setting the frequency of the oscillating signal to a predetermined level to avoid adversely affecting operation of the rotor;
 switching means for alternating the direction of the direct current flowing through the primary coils in response to the oscillating signal and including four pairs of transistors connected electrically together to form a parallel circuit, a first two of said four pairs of transistors forming a first branch and a second two of said four pairs of transistors forming a second branch of the parallel circuit with one end of the pair of primary coils connected between the first two of said four pairs of transistors and with the other end of the pair of primary coils connected between the second two of said four pairs of transistors; and
 a case member including mounting means for receiving and holding the electronic device, said case member supporting the pair of primary coils and the coil yoke at a predetermined distance relative to the mounting means whereby during charging of the power storage device substantially all of the magnetic flux of the magnetic field flows through the at least one secondary coil and the coil yoke.

36. A method for charging a power storage device provided within an electronic device which also includes at least one secondary coil, said method comprising:
 placing the electronic device at a predetermined position on a surface of a casing of a charging apparatus with the at least one secondary coil near said surface;
 positioning a pair of primary coils and a coil yoke at a predetermined position within the casing;
 generating an oscillating signal; and
 switching the direction of direct current flow through the primary coils in response to the oscillating signal so as to induce an alternating current in the at least one secondary coil for charging the power storage device whereby during charging of the power storage device substantially all of the magnetic flux of the magnetic field produced by the pair of primary coils flows through at least one secondary coil and the coil yoke.

* * * * *